United States Patent [19]
Ida et al.

[11] Patent Number: 5,639,403
[45] Date of Patent: Jun. 17, 1997

[54] METHOD OF MOLDING A RESIN ARTICLE WITH AN EMBEDDED WORKPIECE

[75] Inventors: Norihiro Ida; Haruhiko Mihara; Kazuhiko Shinshiki; Kiyohide Katsuya; Hideyuki Takashi, all of Tsu; Masahiro Hiratani, Ichishi, all of Japan

[73] Assignee: Matsushita Electric Works, Ltd., Osaka, Japan

[21] Appl. No.: 391,037

[22] Filed: Feb. 21, 1995

[30] Foreign Application Priority Data

Feb. 23, 1994 [JP] Japan ............................ 6-25693
Dec. 22, 1994 [JP] Japan ............................ 6-320454
Jan. 26, 1995 [JP] Japan ............................ 7-10838

[51] Int. Cl.$^6$ ............................ B29C 33/12; B29C 45/14
[52] U.S. Cl. ............... 264/40.1; 264/255; 264/272.17; 264/278
[58] Field of Search ............................ 264/275, 277, 264/278, 272.11, 272.15, 272.17, 40.1, 255; 425/116, 125

[56] References Cited

U.S. PATENT DOCUMENTS

| | | | |
|---|---|---|---|
| 4,318,879 | 3/1982 | Gartner | 264/278 |
| 4,377,548 | 3/1983 | Pierpont | 264/278 |
| 4,470,786 | 9/1984 | Sano et al. | 264/278 |
| 4,803,030 | 2/1989 | Kobayashi | 264/278 |
| 4,888,307 | 12/1989 | Spairisano et al. | |
| 4,944,908 | 7/1990 | Leveque et al. | 264/278 |
| 5,023,414 | 6/1991 | Mihara et al. | |

FOREIGN PATENT DOCUMENTS

| | | |
|---|---|---|
| 1554997 | 1/1970 | Germany. |
| 3228214 | 1/1987 | Germany. |
| 6387213 | 4/1988 | Japan. |
| 3112025 | 5/1991 | Japan. |
| 1526316 | 9/1978 | United Kingdom. |
| 2103534 | 2/1983 | United Kingdom. |
| 2268700 | 1/1994 | United Kingdom. |
| WO9314618 | 7/1993 | WIPO. |

*Primary Examiner*—Angela Ortiz
*Attorney, Agent, or Firm*—William A. Knoeller

[57] ABSTRACT

A molded article is formed by an injection molding method of embedding a workpiece within a resin by the use of a mold. The mold has a mold cavity, at least one supporting pin removably projecting into the mold cavity to support the workpiece in the mold cavity, and at least one gate for injecting the resin into the mold cavity. The supporting pin is forced against the workpiece to support the workpiece within the molded cavity. The resin is injected into the molded cavity through the gate. In the present method, the supporting pin is removed from the mold cavity after the workpiece is supported by pressure of the resin injected in the mold cavity. The injection of the resin is continued to fill a hole left in the mold cavity by removal of the supporting pin. After the injection is finished, the injected resin is hardened to obtain the molded article. This method is useful for integrally molding a conductive member with an electrically insulating resin to form a component of an electrical device, for example, a base plate or cover plate of an electrical rotary switch for detecting positions of an automatic transmission of an automobile.

5 Claims, 12 Drawing Sheets

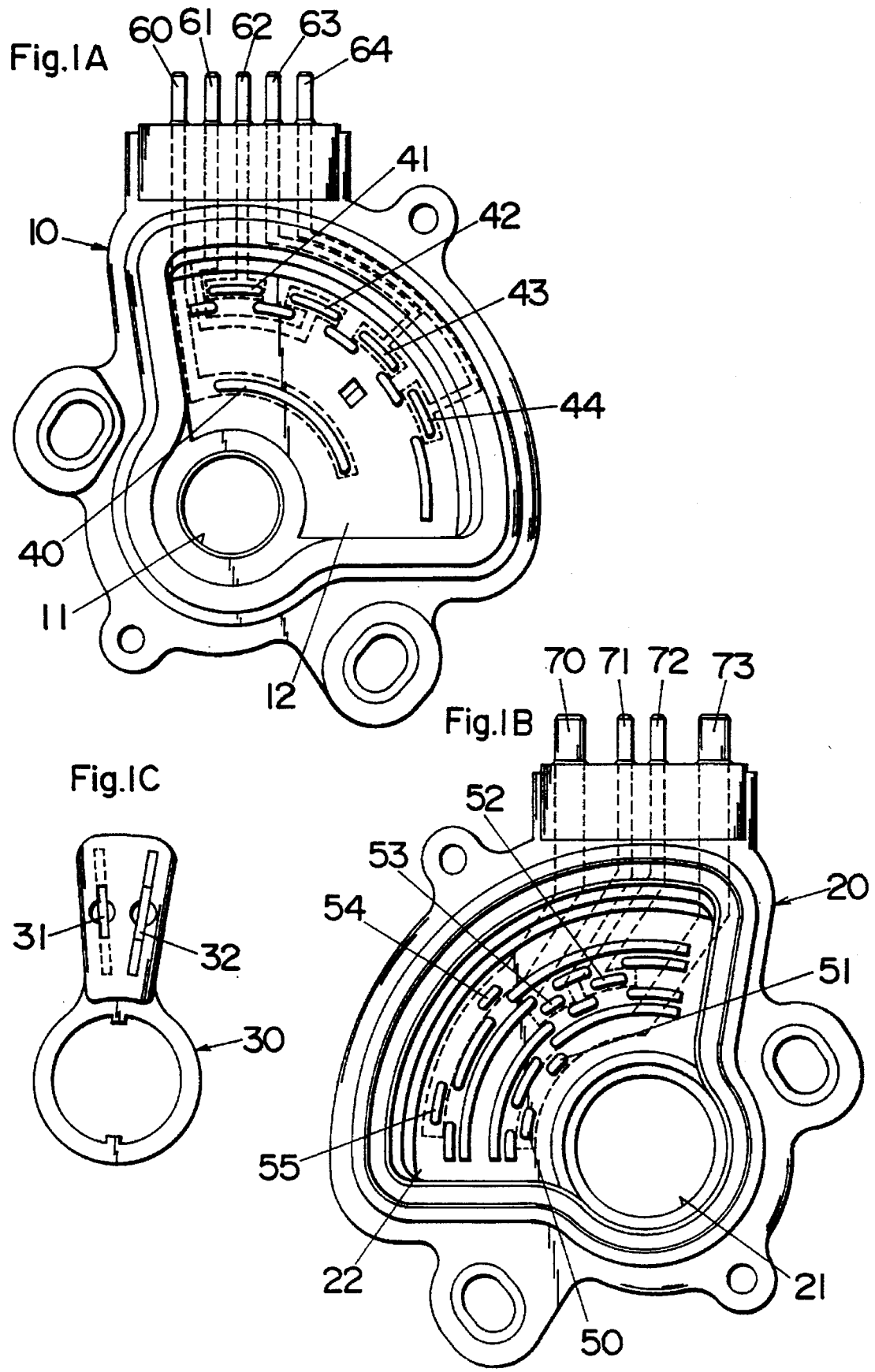

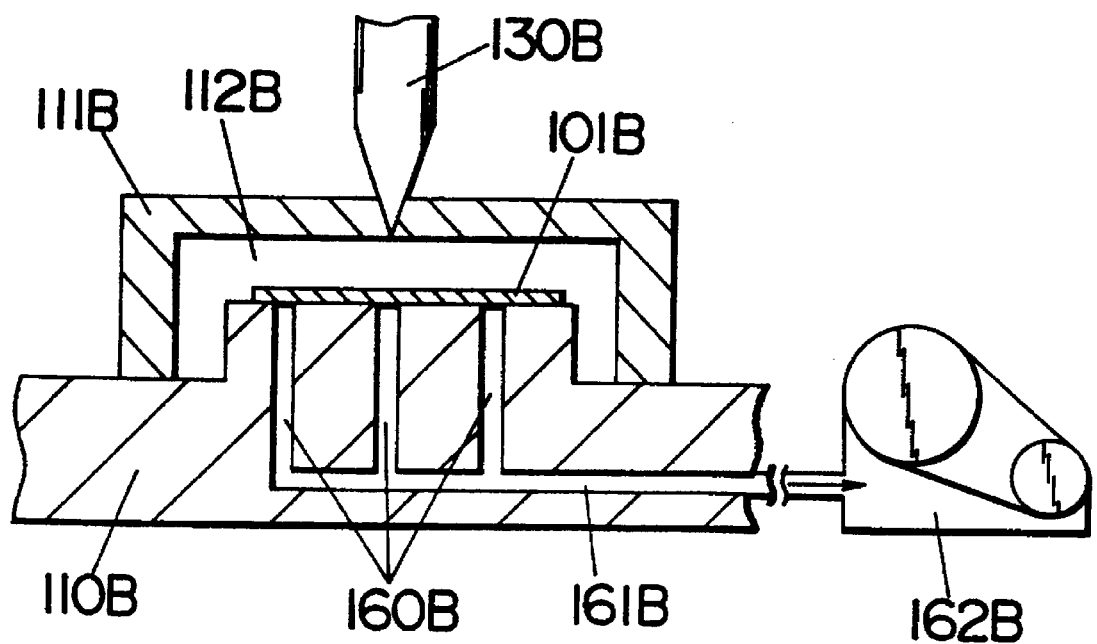

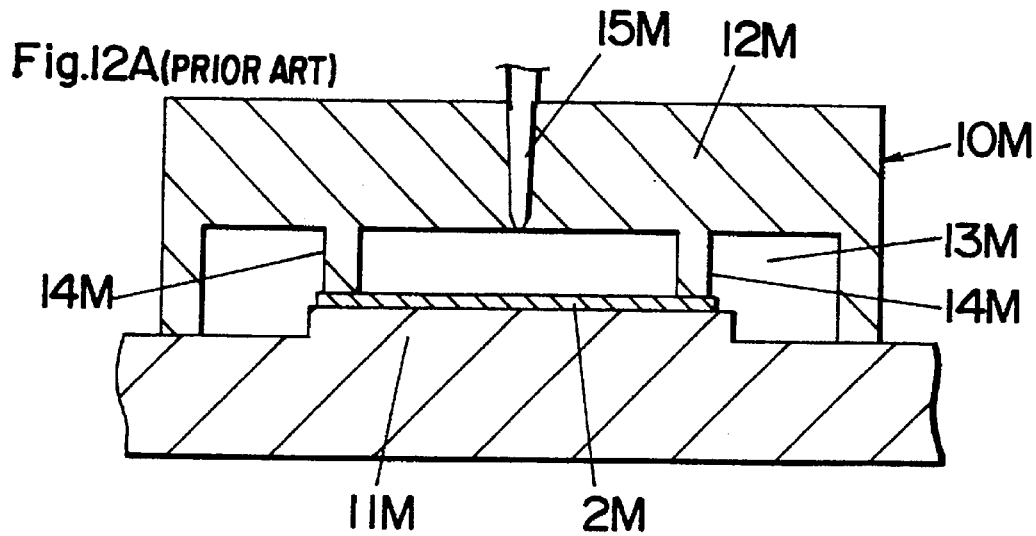
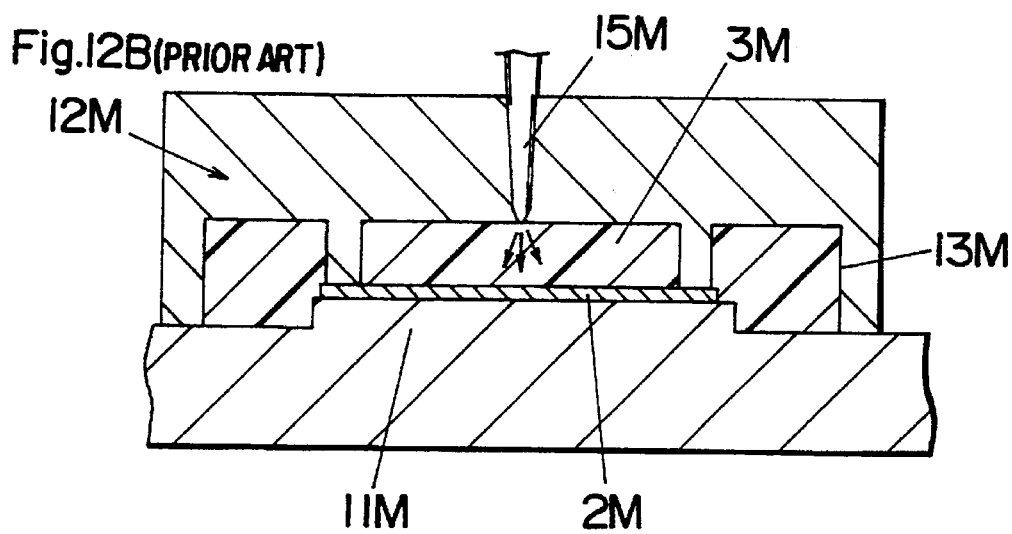
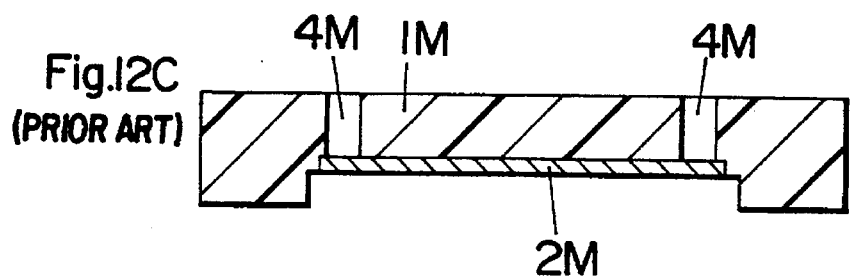
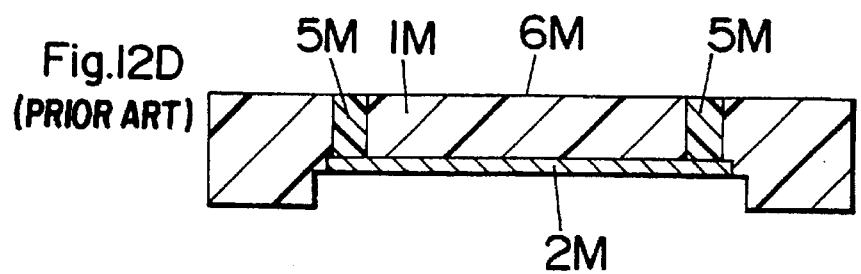

METHOD OF MOLDING A RESIN ARTICLE WITH AN EMBEDDED WORKPIECE

BACKGROUND OF THE INVENTION

1. Field of the Invention

The present invention relates to an injection molding method of embedding a workpiece within a resin to form a molded article, and more particularly to an injection molding method for forming a component of an electrical device, for example, a base plate or cover plate of an electrical rotary switch for detecting positions of an automatic transmission of an automobile.

2. Disclosure of the Prior Art

In the past, injection molding has been utilized to integrally mold a workpiece within a resin to form a molded article. For example, a molded article 1M can formed by an injection molding method with the use of a mold 10M. The mold 10M comprises lower and upper dies 11M and 12M for making a mold cavity 13M therebetween, supporting pins 14M for supporting a workpiece 2M in the mold cavity, and a gate 15M for injecting a resin 3M into the mold cavity 13M, as shown in FIG. 12A. The supporting pins 14M are forced against the workpiece 2M to support the workpiece within the mold cavity 13M, and then the resin 3M is injected into the mold cavity 13M through the gate 15M, as shown in FIG. 12B. The resin 3M injected in the mold cavity 13M is hardened to obtain the molded article 1M, as shown in FIG. 12C.

In this molding method, since the molded article 1M is removed from the mold cavity 13M after the injected resin is hardened, there is a problem because holes 4M are left in the molded article 1M by removal of the supporting pins 14M from the molded article. In case of applying this molding method to form a component of an electrical device, for example, a base plate or cover plate of an electrical rotary switch, which is disclosed in U.S. Pat. No. 5,023,414, for detecting positions of an automatic transmission of an automobile, the problem must be settled to prevent the occurrence of electrical problems with the electrical device. As one approach to the problem, it is possible to perform a supplemental step of filling the holes 4M of the molded article 1M with an additional resin 5M. However, an interface formed between the molded article 1M and the additional resin 5M cast in the holes 3M extends from an exterior surface 6M of the molded article 1M to the workpiece 2M provided in its interior surface, as shown in FIG. 12D. Therefore, there is a probability of causing a leakage through such an interface. In particular, when the workpiece 2M is made of a conductive material, the supplemental step would not be enough to provide electrical insulation between the exterior surface 6M of the molded article 1M and the workpiece 2M for an extended time period.

As another approach to the above problem, a molded article 1N can be formed by a double molding process without leaving holes therein. That is, the molding process comprises first and second steps. The first step uses a first mold 10N having lower and upper dies 11N and 12N for making a mold cavity 13N therebetween, supporting pins 14N for supporting a conductive member 2N in the mold cavity 13N, and a gate 15N for injecting an insulating resin 3N into the mold cavity, as shown in FIG. 13A. In the first step, the supporting pins 14N are forced against the conductive member 2M to support the conductive member within the mold cavity 13N, and then the resin 3N is injected into the mold cavity 13N through the gate 15N, as shown in FIG. 13B. The resin injected into the mold cavity 13N is hardened to obtain an intermediate product 4N. The intermediate product 4N has holes 6N left therein by removal of the supporting pins 14N and a plurality of projections 5N, as shown in FIG. 13C.

The second step uses a second mold 20N having lower and upper dies 21N and 22N for making a mold cavity 23N therebetween, and a gate 24N for injecting the insulating resin 3N into the mold cavity 23N, as shown in FIG. 13D. An inner surface of the upper die 22N is forced against the projections 5N of the intermediate product 4N placed on the lower die 21N to support the intermediate product 4N in the mold cavity 23N without using a supporting pin. Then, the resin 3N is injected into the mold cavity 23N through the gate 24N, as shown in FIG. 13E. The resin injected into the mold cavity 23N is hardened to obtain the molded article 1N. Since no supporting pin is used in the second stage, a hole is not left in the molded article 1N. Therefore, it is not necessary to perform such a supplemental step described above.

However, since an interface formed between the intermediate product 4N and the resin 3N injected in the second step extends from an exterior surface 6N of the molded article 1N to the conductive member 2N embedded in its interior surface, as shown in FIG. 13F, there is a probability of causing a leakage through such an interface when the molded article 1N is used for an extended time period. Therefore, the molding process would not be enough to provide electrical insulation between the exterior surface 6N of the molded article 1N and the conductive member 2N provided in its interior surface.

SUMMARY OF THE INVENTION

For solving the above problem, a primary object of the present invention is to provide an injection molding method of embedding a workpiece within a resin by the use of a mold to form a molded article. The mold has a mold cavity, at least one supporting pin removably projecting into the mold cavity to support the workpiece in the mold cavity, and at least one gate for injecting the resin into the mold cavity. The supporting pin is forced against the workpiece to support the workpiece within the mold cavity. The resin is through the gate into the mold cavity having the workpiece. In the present method, the supporting pin is removed from of the mold cavity after the workpiece is supported by a pressure of the resin injected in the mold cavity. The injecting of the resin into the mold cavity is continued to fill a hole left in the mold cavity by removal of the supporting pin. That is, the hole left in the mold cavity can be filled with the resin while injecting the resin into the mold cavity. After the injecting of the resin is finished, the resin in the mold cavity is hardened to obtain the molded article. Therefore, the present method does not need a supplemental step of filling the hole with an additional resin after the injected resin is hardened. In addition, the present method can provide the molded article without the problem of leakage.

In a preferred embodiment of the present invention, the mold further includes a sub-gate located adjacent the supporting pin for injecting the resin. The hole left in the mold cavity by removal of the supporting pin can be efficiently filled with the resin injected through the sub-gate.

In a further preferred embodiment of the present invention, the pressure of the resin injected in the mold cavity is monitored by a pressure sensor mounted in the mold cavity. For determining an optimum timing of removing the supporting pin from the mold cavity during the injection of the resin, and confirming that the resin is uniformly supplied throughout the mold cavity, it is preferred to mount the pressure sensor in the vicinity of a narrowest space in the mold cavity or at a farthest position from the gate in the mold cavity.

The present method is useful to integrally mold a conductive member with an electrically insulating resin to form a component of an electrical device, for example, a base plate or cover plate of an electrical rotary switch, which is disclosed in U.S. Pat. No. 5,023,414, for detecting positions of an automatic transmission of an automobile.

These and still other objects and advantages of the present invention will become more apparent from the following description of a preferred embodiment when taken in conjunction with the attached drawings.

BRIEF DESCRIPTION OF THE DRAWING

FIGS. 1A to 1C are plan views of a base plate, cover plate, and an actuator, respectively, of an electrical rotary switch disclosed in U.S. Pat. No. 5,023,414;

FIG. 9 is a schematic view illustrating an injection molding method of a third embodiment of the present invention;

FIGS. 12A to 12D are schematic views illustrating an injection molding method of the prior art.

DETAILED DESCRIPTION OF PREFERRED EMBODIMENTS

[First Embodiment]

Figure 2A:
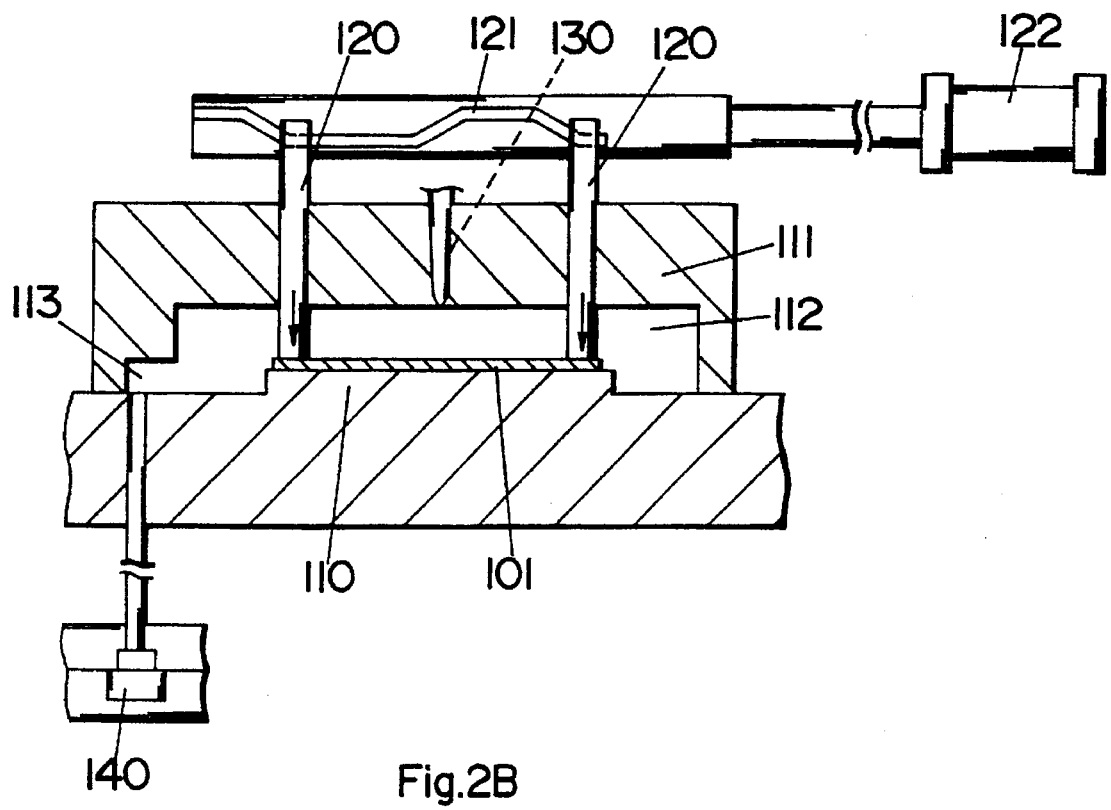
FIGS. 2A and 2B are schematic views illustrating a first stage of a first embodiment of the present invention for integrally molding a conductive member within a first resin to form an intermediate product.

In a first embodiment, an injection molding method of the present invention is applied to form a base plate which is one of components of an electrical rotary switch as disclosed in U.S. Pat. No. 5,023,414. The rotary switch is for detecting positions of an automatic transmission of an automobile and controlling correspondingly an external electric circuit in association with the detected position of the transmission. As shown in FIGS. 1A to 1C, the rotary switch comprises a generally sector shaped switch casing composed of a pair of the base plate 10 and a cover plate 20 which are shaped into a generally symmetrical configuration having holes 11 and 21 for receiving a control output shaft of the automatic transmission, and an actuator 30 supported between the plates 10 and 20 so as to be rotatable about common axis of the holes 11 and 21 in synchronism with the control output shaft. The base and cover plates 10 and 20 are made of an electrically insulating material, and formed respectively in its interior surface with recesses 12 and 22 which cooperate to form a space for receiving the actuator 30. A plurality of circumferentially arranged fixed contacts 40 to 44 and 50 to 55 are provided in the recesses 12 and 22, respectively. The interior surfaces of the base and cover plates 10 and 20 face each other in the switch casing. The fixed contacts 40 to 44 and 50 to 55 are electrically connected to individual terminal pins 60 to 64 and 70 to 73 projecting on the respective plate 10 and 20 for connection with the external electric circuit. The actuator 30 has first and second opposed faces confronting the interior surfaces of the base and cover plates 10 and 20. The first and second faces respectively carry first and second movable contacts 31 and 32 for electrical conduction between selective ones of the fixed contacts 40 to 44 and 50 to 55 on the respective plate 10 and 20 depending upon a particular position of the actuator 30.

The injection molding method of forming the base plate 10 is divided to a first stage responsible for integrally molding a conductive member 101 made of copper for the fixed contacts 40 to 44 with a first resin 102 to form an intermediate product 103, and a second stage responsible for integrally molding the intermediate product 103 with a second resin 104 to form the base plate 10.

As shown in FIG. 2A, the first stage uses a first mold having lower and upper dies 110 and 111 for making therebetween a mold cavity 112 designed to the shape of the intermediate product 103, a plurality of supporting rods 120 removably projecting into the mold cavity 112 to support the conductive member 101 in the mold cavity 112, a plurality of gates 130 for injecting the first resin 102 into the mold cavity 112, and a pressure sensor 140 for monitoring a pressure of the resin injected in the mold cavity 112. The first resin 102 is an electrically insulating resin. For example, nylon, polyacetal or the like, may be used as the first resin. The supporting rods 120 can be moved by a sliding cam 121 coupled to an air cylinder 122. The pressure sensor 140 is disposed away from the gates 130 and in the vicinity of a narrowest space 113 in the mold cavity 112.

Figure 2B:
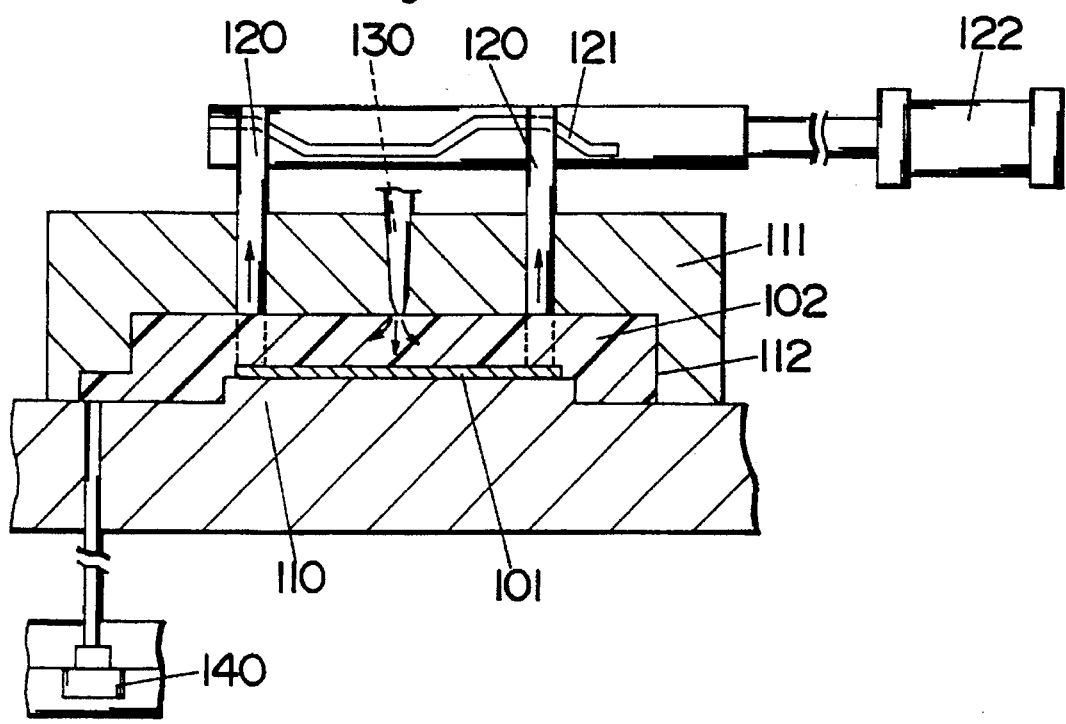
Figure 3:
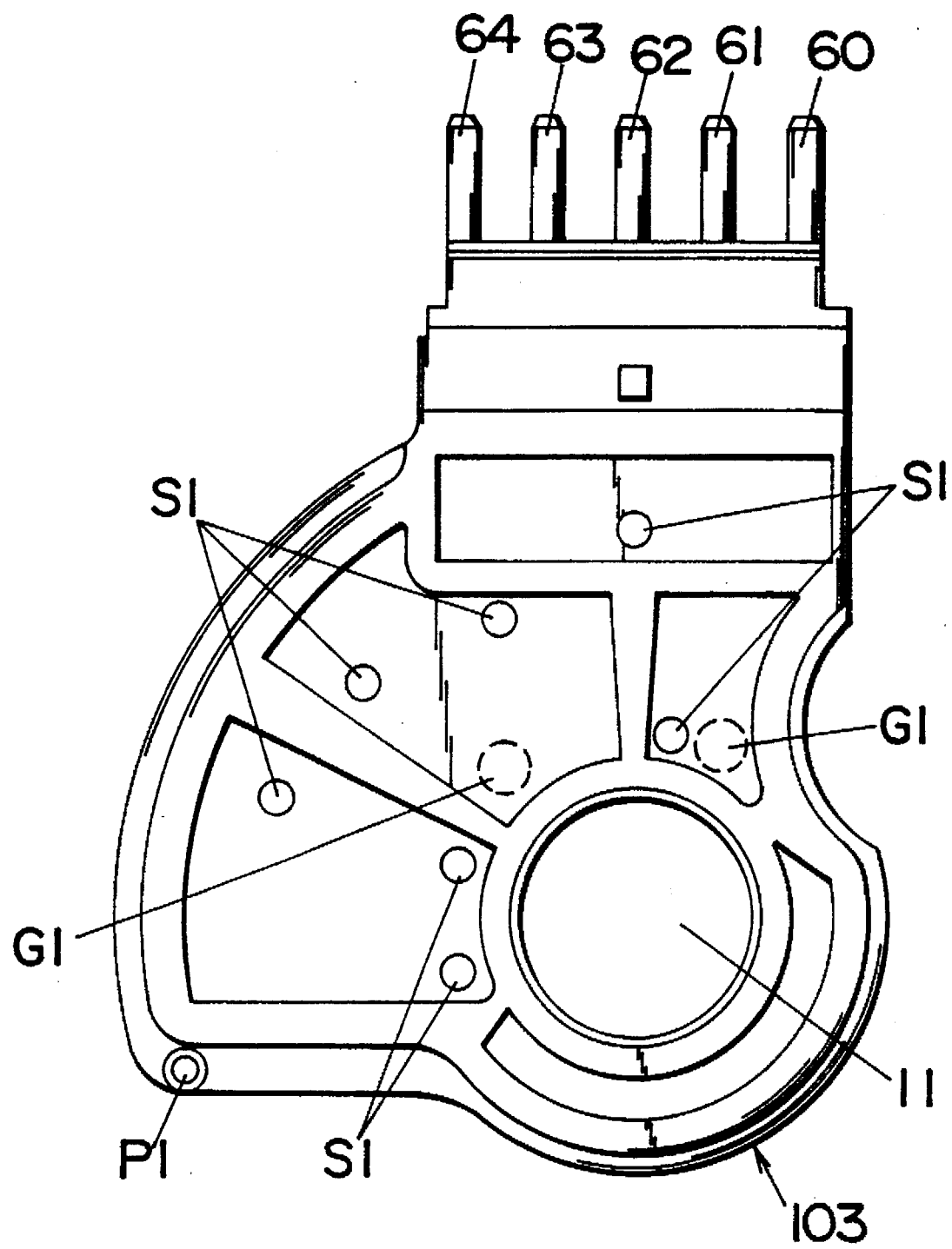
FIG. 3 is a plan view of the intermediate product indicating positions of supporting rods in the first stage.

The supporting rods 120 are forced against the conductive member 101 with adequate clamping force to support the conductive member within the mold cavity 112. In FIG. 3, "S1" designates positions of the supporting rods 120. "G1" designates positions of the gates 130. "P1" designates a position of the pressure sensor 140. The first resin 102 is injected in the mold cavity 112 having the conductive member 101. When a monitored pressure value of the first resin 102 injected in the mold cavity 112 is beyond a threshold pressure value which is a pressure value sufficient to stably support the conductive member 101 with the first resin 102 injected in the mold cavity, the supporting rods 120 are removed from the mold cavity 112, as shown in FIG. 2B. For example, the threshold pressure value can be determined as a pressure value monitored by the pressure sensor 140 when a volume of the first resin 102 injected in the mold cavity 112 reaches more than 50 vol %, and more preferably more than 80 vol % of the mold cavity 112. Subsequently, the injection of the first resin 102 is continued to fill holes left in the mold cavity 112 by removal of the supporting rods 120. After the injection, the first resin 102 injected in the mold cavity 112 is hardened to obtain the intermediate product 103. In the first stage, since the holes left in the mold cavity 112 can be filled with the first resin 102 while injecting the first resin in the mold cavity, it is necessary to perform a supplemental step of filling the holes left in the intermediate product 103 with an additional resin after the injected resin is hardened.

Figure 4A:
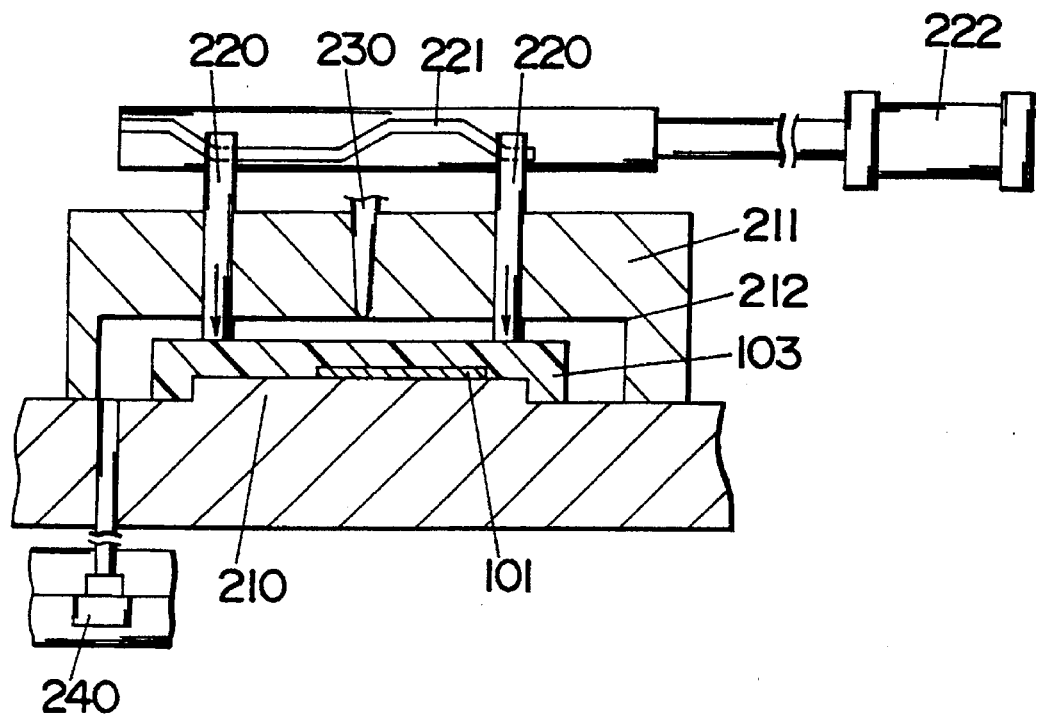
FIGS. 4A to 4C are schematic views illustrating a second stage of the first embodiment of the present invention for integrally molding the intermediate product within a second resin to form the base plate.

As shown in FIG. 4A, the second stage uses a second mold having lower and upper dies 210 and 211 for making therebetween a mold cavity 212 designed to the shape of the base cover 10, a plurality of supporting rods 220 removably projecting into the mold cavity 212 to support the intermediate product 103 within the mold cavity 212, a plurality of gates 230 for injecting the second resin 104 into the mold cavity 212, and a pressure sensor 240 for monitoring a pressure of the second resin 104 injected in the mold cavity 212. The supporting rods 220 can be moved by a sliding cam 221 coupled to an air cylinder 222. The second resin 104 is an electrically insulating resin having excellent wear resistance. For example, polybutylene terephthalate (PBT), polyphenylene sulfide (PPS), or the like, may be used as the second resin. For greater improvement of the wear resistance of the second resin, it is preferred to use a glass-fiber reinforced resin.

Figure 4B:
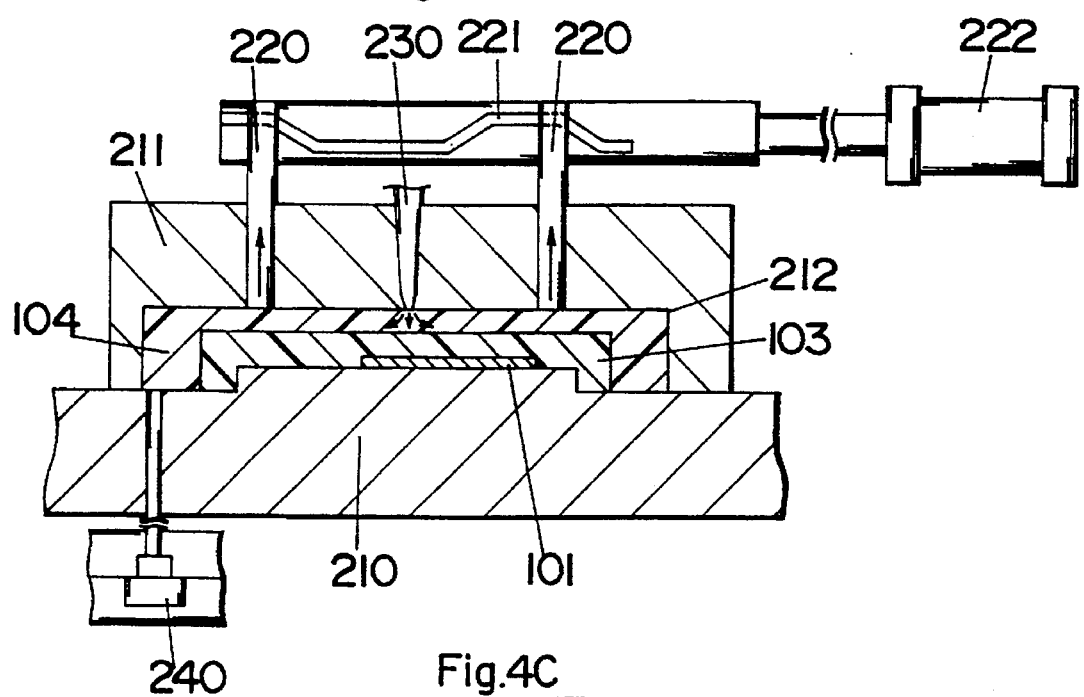
Figure 4C:
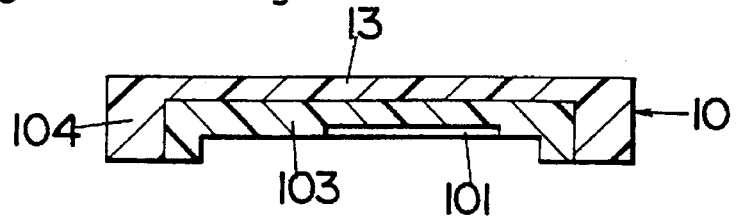
Figure 5:
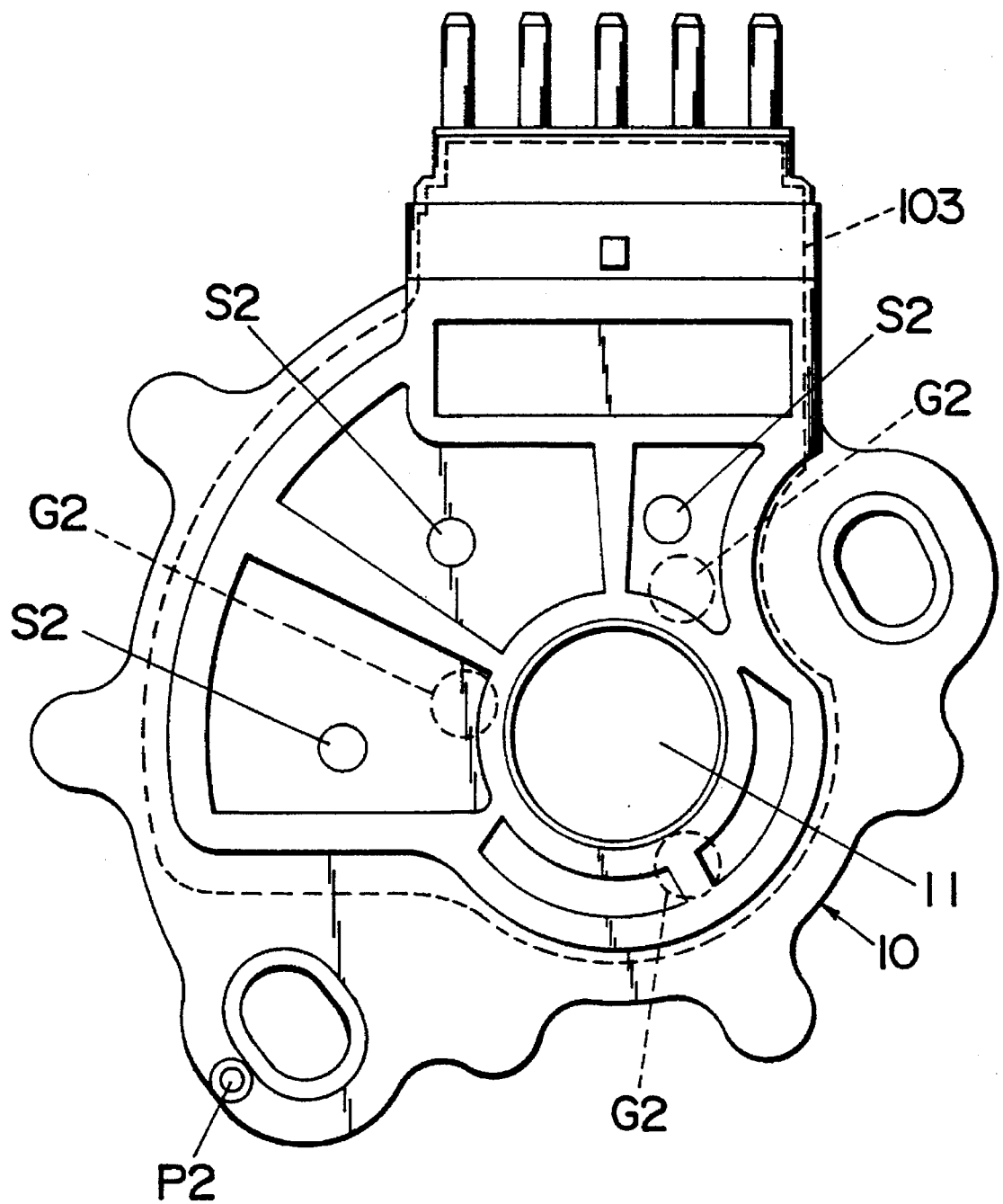
FIG. 5 is a plan view of the base plate indicating positions of supporting rods in the second stage.

The supporting rods 220 are forced against the intermediate product 103 with adequate clamping force to support the intermediate product within the mold cavity 212. In FIG. 5, "S2" designates positions of the supporting rods 220. "G2" designates positions of the gates 230. "P2" designates a position of the pressure sensor 240. The second resin 104 is injected into the mold cavity 212 having the intermediate product 103. When a monitored pressure value of the second resin 104 injected into the mold cavity 212 is beyond a threshold pressure value which is a pressure value sufficient to stably support the intermediate product 103 with the second resin 104 injected in the mold cavity 212, the supporting rods 220 are removed from the mold cavity 212, as shown in FIG. 4B. Subsequently, the injection of the second resin 104 is continued to fill holes left in the mold cavity 212 by removal of the supporting rods 220. After the injection, the second resin 104 injected in the mold cavity 212 is hardened to obtain the base plate 10. In the second stage, the holes left in the mold cavity 212 can be filled with the second resin 104 while injecting the second resin in the mold cavity. An interface formed between the intermediate product 103 and the second resin 104 does not extend from an exterior surface 13 of the base plate 10 to the conductive member 101 provided in its interior surface, as shown in FIG. 4C. Therefore, the base plate 10 formed by the present method can provide electrical insulation between the exterior surface 13 thereof and the interior surface carrying the conductive member 101 without causing a leakage therebetween.

It is preferred that each of the supporting rods 120 and 220 is configured in a tapered shape such that it is easily removed from the respective mold cavity 112 and 212. In addition, a Teflon® or chromium coating may be preferably performed on a surface of the respective supporting rod 120 and 220.

For determining a timing of removing the supporting rods 120 from the mold cavity 112 during the injection of the first resin 102, an injection time of the first resin 102 necessary to reach the threshold pressure can be initially measured. In this case, the supporting rods 120 may be removed from the mold cavity 112 in accordance with the injection time in place of the monitored pressure of the first resin 102 injected in the mold cavity 112. Similarly, it is possible to remove the supporting rods 220 from the mold cavity 212 in accordance with such an injection time.

Figure 6:
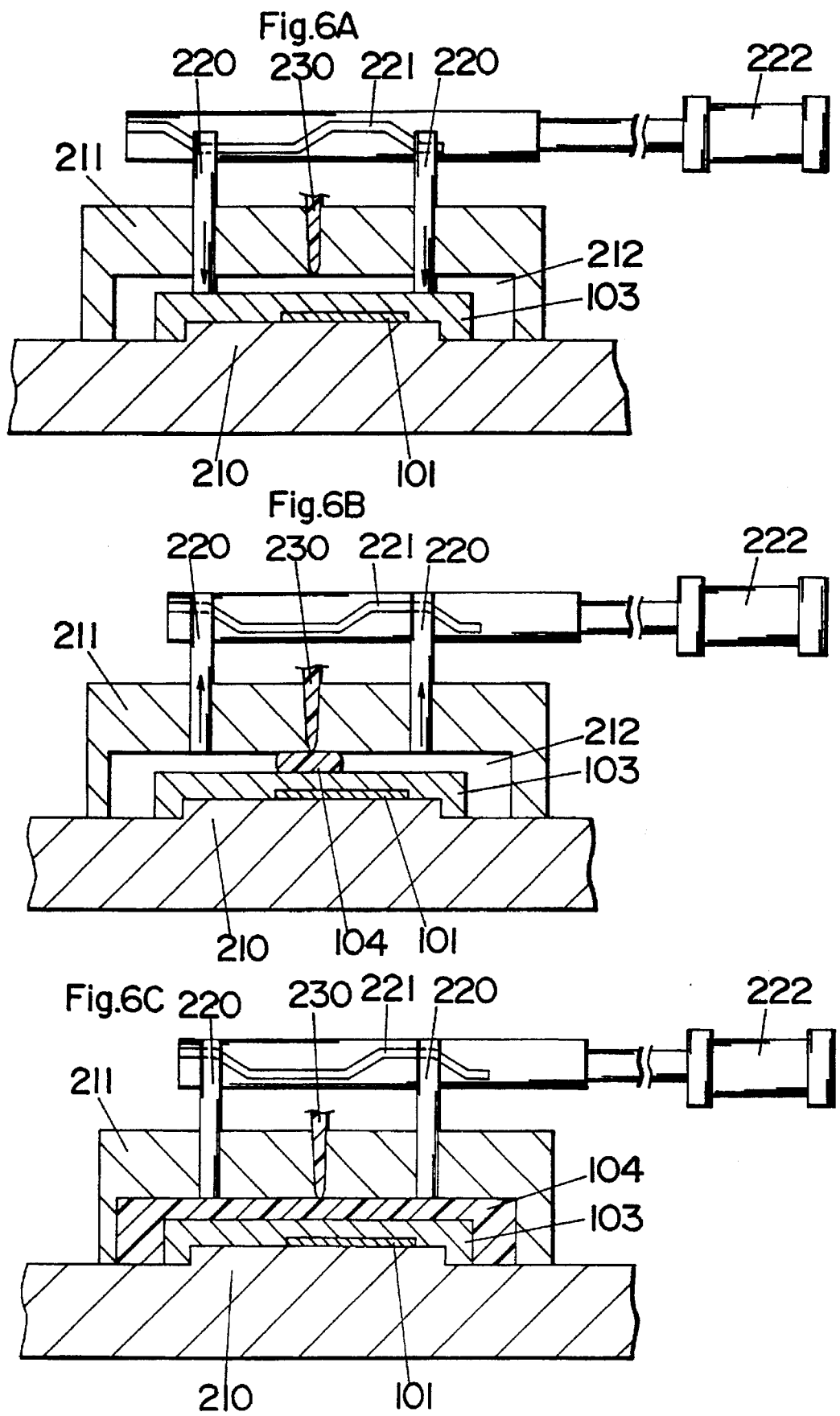
FIGS. 6A to 6C are schematic views illustrating an injection molding method which is a modification of the first embodiment.

In the second stage, when the lower die 210 stably contacts with the intermediate product 103, it is possible to remove the supporting rods 220 from the mold cavity 212 immediately after starting the injection of the second resin 104, as shown in FIGS. 6A to 6C. The intermediate product 103 can be stably supported in the mold cavity 212 by an injection pressure of the second resin 104 from the gates 230 during the injection.

Figure 7:
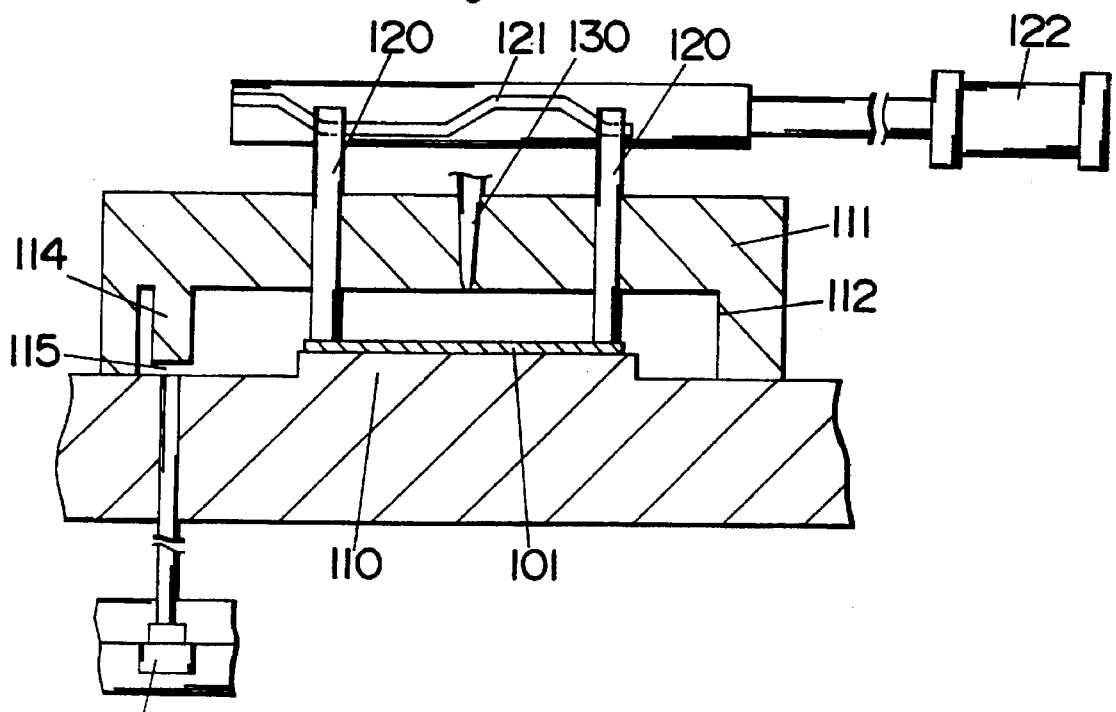
FIG. 7 is a schematic view showing a pressure detecting space formed in a mold cavity.

For confirming that the first resin 102 is uniformly supplied throughout the mold cavity 112 in the first stage, a pressure detecting space 115 may be preferably formed in the mold cavity 112 as shown in FIG. 7. That is, a pin 114 is projected into the mold cavity 112 from the upper die 111 to make the pressure detecting space 115 between the pin 114 and the pressure sensor 140 mounted in the lower die 110. Similarly, it is possible to form such a pressure detecting space in the mold cavity 212 of the second mold.

[Second Embodiment]

Figure 8A:
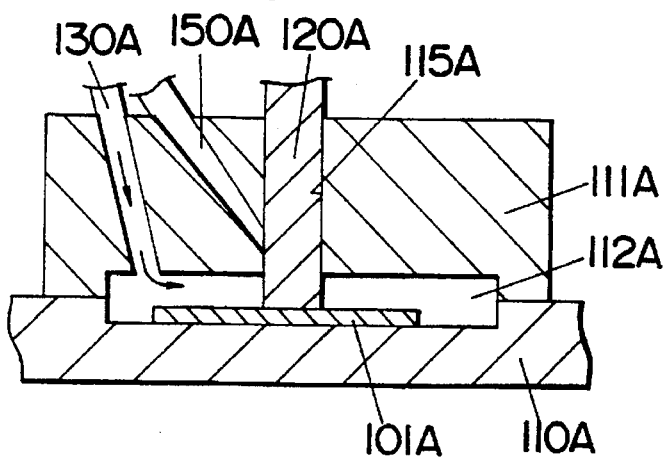
FIGS. 8A and 8B are schematic views illustrating a supply of a resin into a mold cavity through a sub-gate of a second embodiment of the present invention.
Figure 8B:
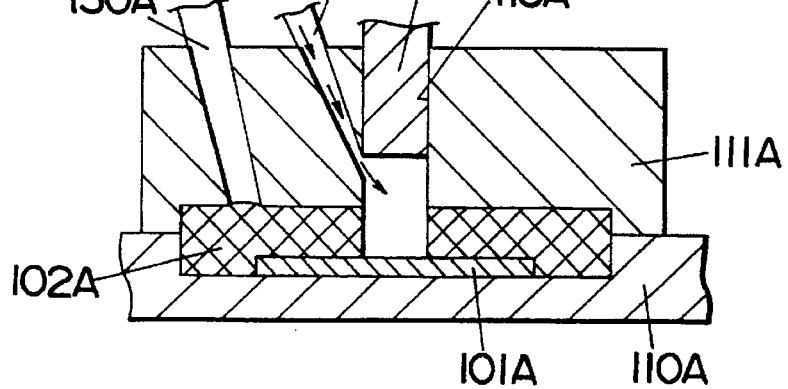

An injection molding method of a second embodiment of the present invention are distinguished from that of the first embodiment by the step of filling holes left in a mold cavity by removal of supporting rods with a resin injected from sub-gates located adjacent the supporting pins. That is, as shown in FIGS. 8A, a supporting rod 120A is supported in a cylindrical hole 115A of a upper die 111A of a first mold so as to removably project to a mold cavity 112A. A sub-gate 150A is formed in the first mold to reach the cylindrical hole 115A. When the supporting rod 120A is forced against a conductive member 101A to support the conductive member 101A on a lower die 110A within the mold cavity 112A, the sub-gate 150A is closed by a side face of the supporting rod 120A, as shown in FIG. 8A. A first resin 102A is injected into the mold cavity 112A having the conductive member 101A through a gate 130A. The injection of the first resin 102A from the gate 130A is continued until a pressure value of the first resin injected into the mold cavity 112A is beyond a threshold pressure value. The pressure value of the first resin 102A is measured by a pressure sensor (not shown) mounted in the mold cavity 112A. Immediately after the injection of the first resin 102A from the gate 130A is finished, the supporting rod 120A is removed out of the mold cavity 112A into the cylindrical hole 115A to open the sub-gate 150A. The first resin 102A is injected through the sub-gate 150A into a hole left in the mold cavity 112A by removal of the supporting rod 120A, as shown in FIG. 8B. Therefore, the hole left in the mold cavity 112A can be efficiently filled with the first resin 102A injected from the sub-gate. Similarly, a second mold having such a sub-gate can be used for the second stage of the first embodiment.

[Third Embodiment]

Figure 10:
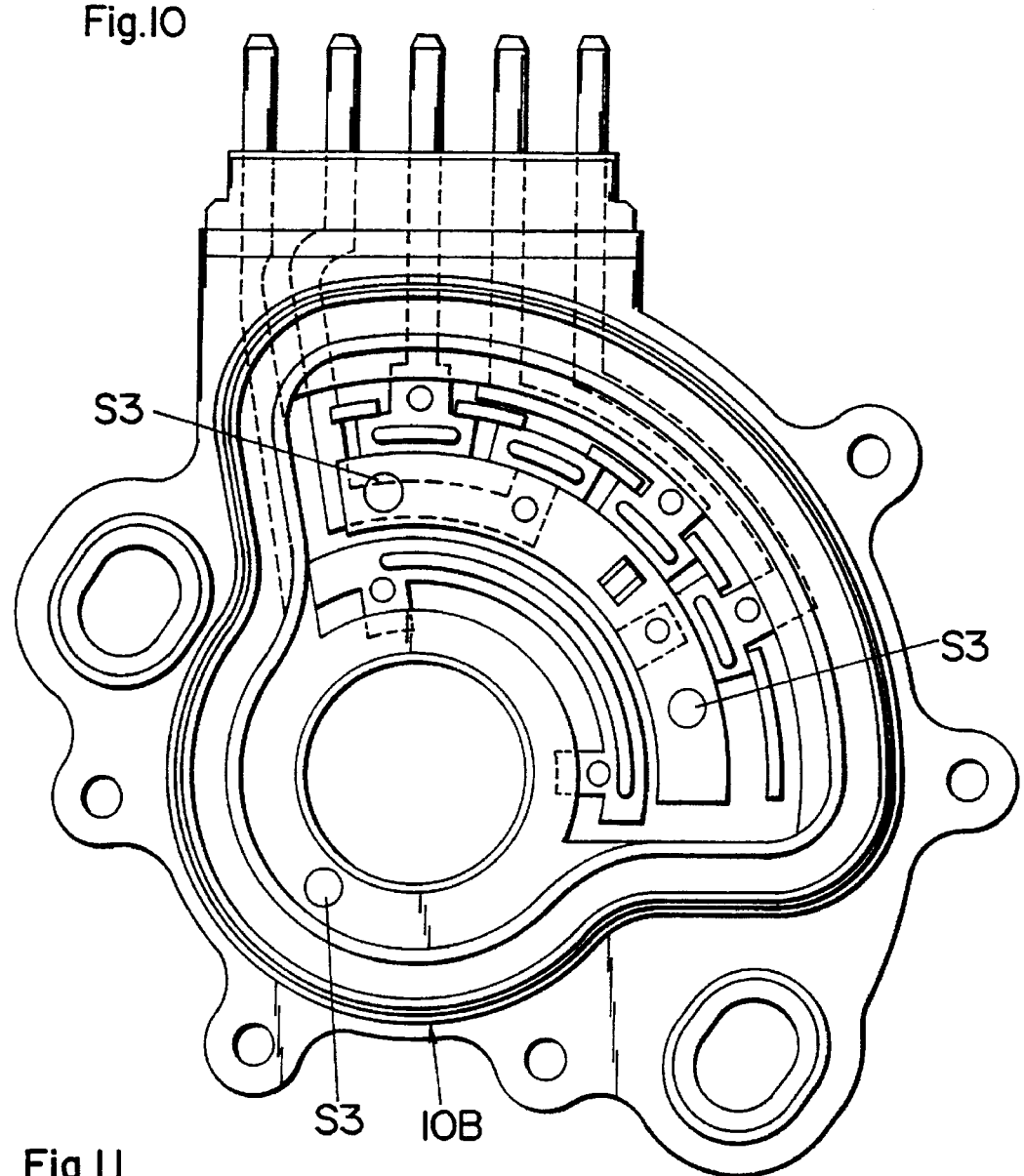
FIG. 10 is a plan view of a base plate indicating positions of suction gates.

An injection molding method of a third embodiment of the present invention is performed in place of that of the first stage of the first embodiment. The method uses a third mold having lower and upper dies 110B and 111B make a mold cavity 112B therebetween, suction gates 160B formed in the lower die 110B for supporting a conductive member 101B within the mold cavity 112B by vacuum, and gates 130B for injecting a first resin into the mold cavity 112B. A suction line 161B extends through the suction gates 160B between the mold cavity 112B and a vacuum pump 162B, as shown in FIG. 9. It is preferred that a supporting force of the conductive member 101B by vacuum is about 10 kg/cm$^3$. One side of the conductive member 101B are supported on the lower die 110B in the mold cavity 112B with the suction gates 160B. The first resin is injected in the mold cavity 112B on the opposite side of the conductive member 101B from the gate 130B. After the injection of the first resin is finished, the injected resin is hardened to obtain an intermediate product. Similarly, the above method of the third embodiment can be performed for the second stage of the first embodiment. In FIG. 10, "S3" designates positions of suction gates in case of forming a base plate 10B in accordance with the method of the third embodiment.

Figure 11:
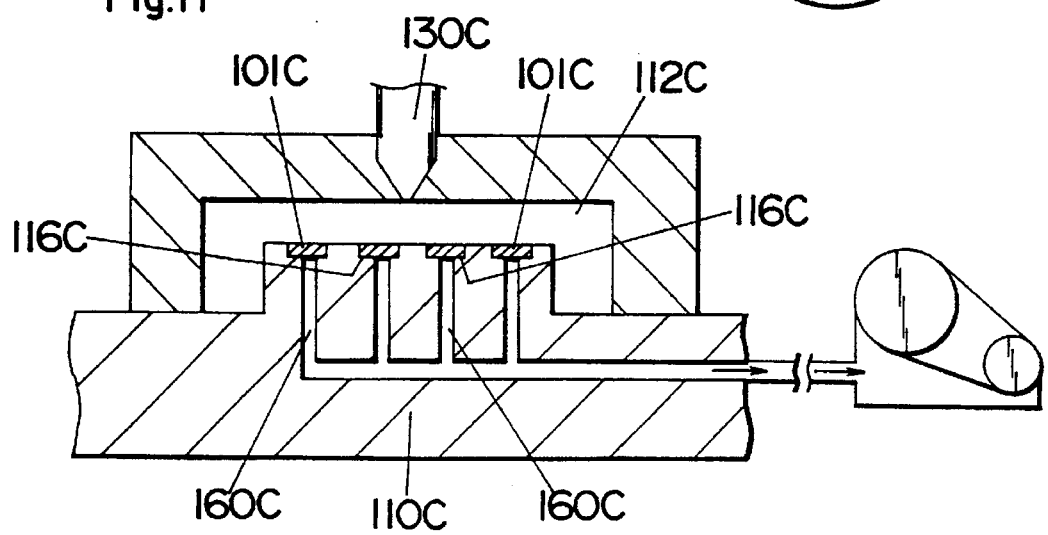
FIG. 11 is a schematic view showing a modification of the third embodiment.
Figure 13A:
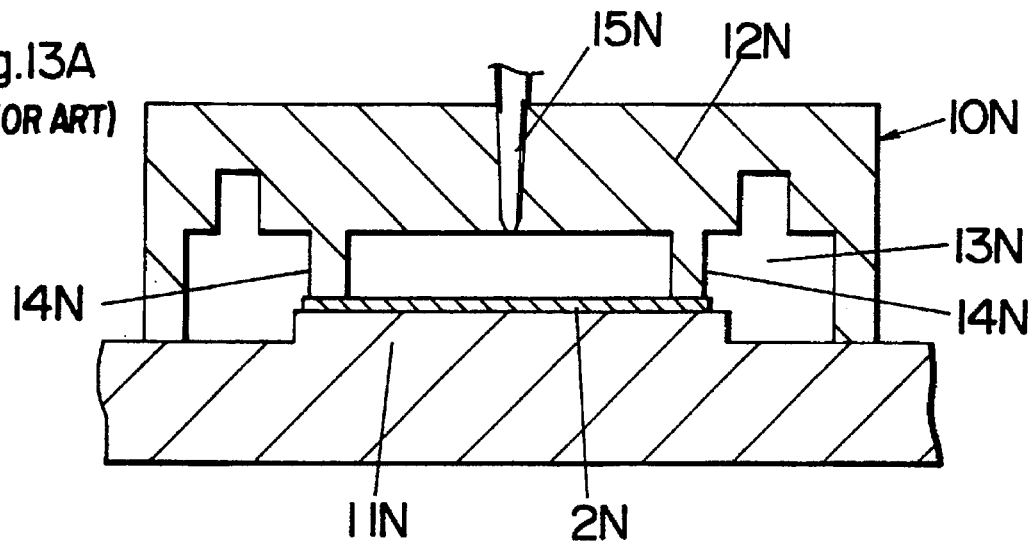
FIGS. 13A to 13F are schematic views illustrating a double molding process of the prior art.
Figure 13B:
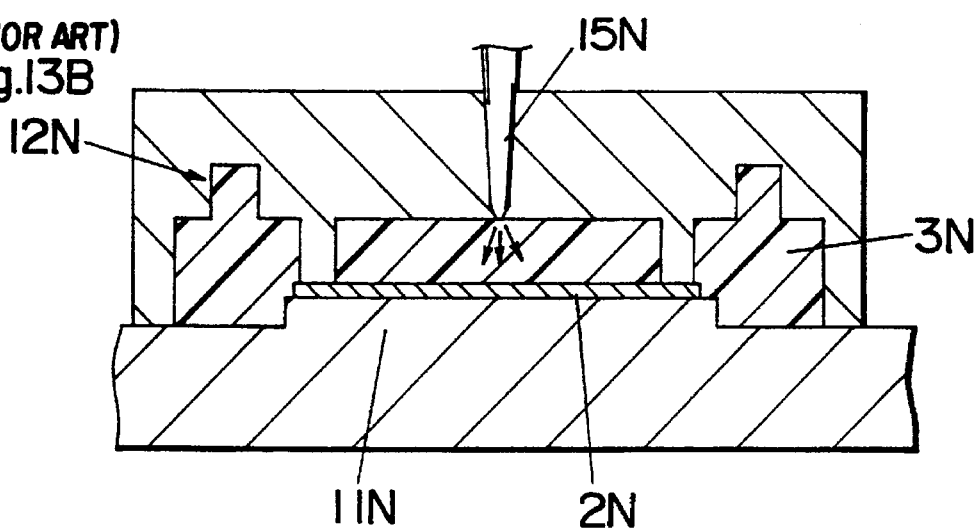
Figure 13C:
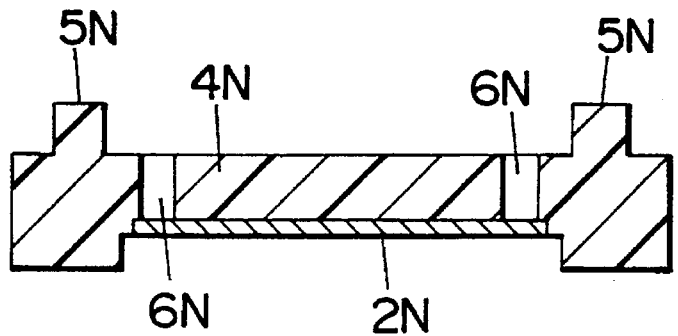
Figure 13D:
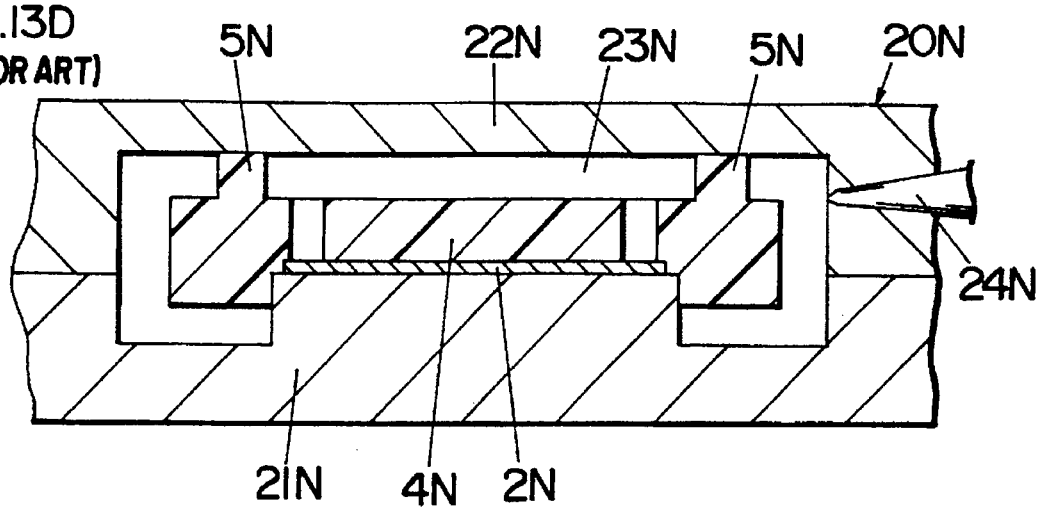
Figure 13E:
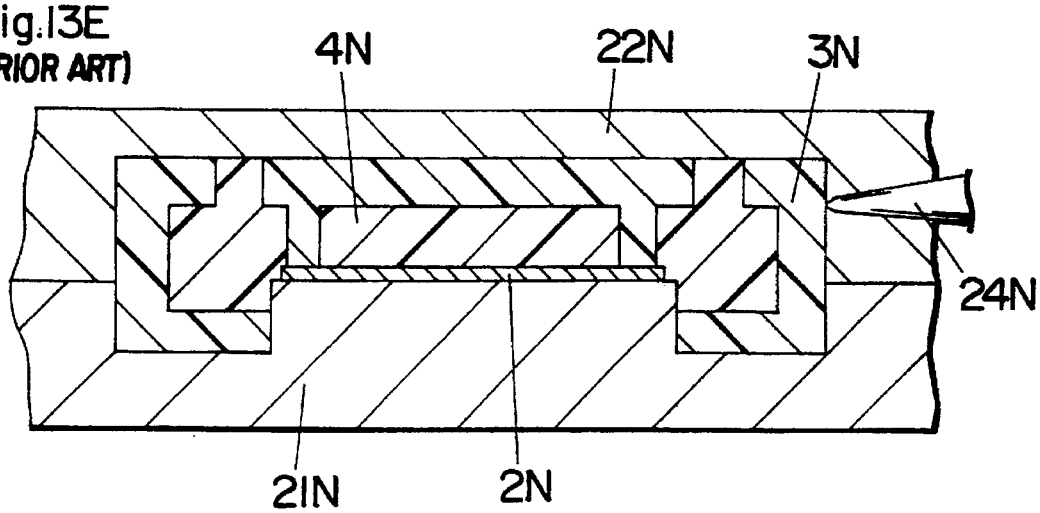
Figure 13F:
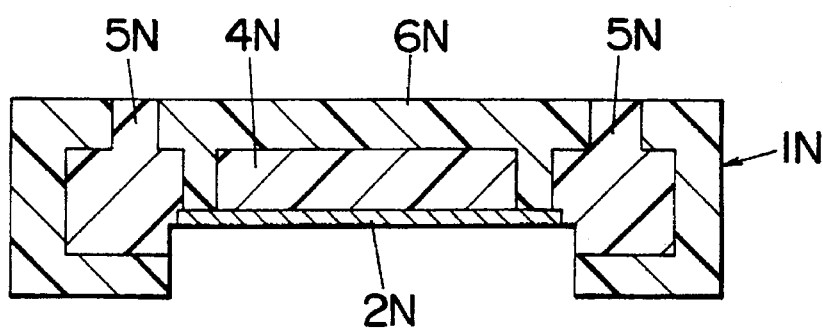

As a modification of the third embodiment, for integrally molding a plurality of conductive members 101C with a resin, shallow grooves 116C corresponding to the shapes of the conductive members 101C may be preferably formed in a lower die 110C. The conductive members 101C can be stably supported in a mold cavity 112C with a plurality of suction gates 160C formed in the grooves 116C, as shown in FIG. 11.

What is claimed is:

1. A method for forming a molded article with an embedded workpiece within a resin by the use of a mold, said mold having a mold cavity, at least one supporting pin removably projecting into said mold cavity to support said workpiece in said mold cavity, at least one gate for injecting said resin into said mold cavity and a sub-gate located adjacent to said supporting pin such that said sub-gate is closed by said supporting pin as long as said supporting pin projects into said mold cavity, said method comprising the steps of:

forcing said supporting pin against said workpiece to support said workpiece within said mold cavity;

injecting an amount of said resin into said mold cavity through said gate;

removing said supporting pin from said mold cavity while opening said sub-gate, after said workpiece is supported by a pressure of said resin injected in said mold cavity;

injecting an additional amount of said resin through said sub-gate and into said mold cavity to fill a hole left in said mold cavity by removal of said supporting pin; and hardening said resin in said mold cavity to obtain said molded article.

2. A method as set forth in claim 1, wherein said mold includes a plurality of gates for injecting said resin into said mold cavity so as to develop uniform resin pressure on said workpiece.

3. A method as set forth in claim 1, wherein said pressure of said resin injected in said mold cavity is monitored by pressure detecting means mounted in said mold cavity.

4. A method as set forth in claim 3, wherein said detecting means is mounted in the vicinity of a narrowest space in said mold cavity.

5. A method as set forth in claim 3, wherein said detecting means is mounted at a farthest position from said gate in said mold cavity.

* * * * *